United States Patent [19]

Kuder et al.

[11] Patent Number: 4,478,782

[45] Date of Patent: Oct. 23, 1984

[54] ERASABLE RECORDING MEDIUM COMPRISING A DIMER ACID POLYAMIDE RESIN

[75] Inventors: James E. Kuder, Fanwood; Anthony J. East, Madison, both of N.J.

[73] Assignee: Celanese Corporation, New York, N.Y.

[21] Appl. No.: 532,139

[22] Filed: Sep. 14, 1983

Related U.S. Application Data

[63] Continuation-in-part of Ser. No. 390,162, Jul. 21, 1982, abandoned.

[51] Int. Cl.$^3$ .................... G01D 15/34; B29C 25/00
[52] U.S. Cl. .................................. 264/345; 346/1.1; 346/135.1; 346/137; 369/275; 369/284; 369/285; 428/64; 428/435; 428/458; 428/476.3; 428/474.4; 430/945

[58] Field of Search ................ 369/275, 284, 286, 16; 346/135.1, 137, 1.1; 428/435, 458, 476.3, 64, 476.9, 65, 474.4; 430/945; 264/345

[56] References Cited

U.S. PATENT DOCUMENTS 3,262,122  7/1966  Fleisher et al. ................... 346/1.1
3,475,760 10/1969  Carlson ............................ 346/135.1

*Primary Examiner*—Alexander S. Thomas
*Attorney, Agent, or Firm*—Burns, Doane, Swecker & Mathis

[57] ABSTRACT

Provided is an erasable recording medium and a method for recording and erasing same. The erasable recording medium comprises a thermally stable substrate and a polymeric layer deposited on the substrate comprised of a dimer acid polyamide. Such a recording medium has an excellent dimensional and mechanical stability on storage, readily and easily records information, and has an ability to be easily and completely erased when erasure is desired.

66 Claims, No Drawings

ERASABLE RECORDING MEDIUM COMPRISING A DIMER ACID POLYAMIDE RESIN

CROSS-REFERENCE TO RELATED APPLICATION

This application is a continuation-in-part of U.S. application Ser. No. 390,162, filed July 21, 1982 abandoned.

BACKGROUND OF THE INVENTION

1. Field of the Invention

This invention relates to a novel optical information recording medium and the recording of information thereon. More particularly, the present invention relates to an information recording medium, preferably in the form of a disk, suitable for use with optical recording and playback apparatus, which recording medium is stable yet readily and accurately erasable.

2. Description of the Prior Art

Various optical recording media and methods for recording information thereon are known to the prior art. For example, the recording of information in the form of deformations or ripples in a thermoplastic film is known, with techniques for achieving such deformations involving the steps of (1) forming a charge pattern on the surface of the thermoplastic film in accordance with the information to be recorded, (2) heating the thermoplastic film to its melting point so as to permit the electrostatic forces produced by the charges to form a deformation pattern in the thermoplastic film corresponding to the charge pattern and thus to the information to be recorded, and (3) then cooling the thermoplastic film below its melting point to fix the thus formed deformation pattern in the film. Reading of the information represented by the deformation pattern in the thermoplastic film may be accomplished using well known optical techniques. See, e.g., U.S. Pat. No. 3,952,146.

Techniques for erasing the deformation pattern involve reheating the thermoplastic film above its melting point to a significantly higher termperature than during recording in order to permit surface tension to smooth out the surface. Selective erasure may be accomplished by confining the heating to a selected area. After cooling, another deformation pattern may be recorded in the thermoplastic film.

Clemens, in U.S. Pat. Nos. 3,842,194; 3,842,217; and 3,909,517; describes a conductive video disk comprising a molded plastic disk having video and audio information in the form of geometric variations in a spiral groove in the disk surface. These disks are coated first with a conductive material, such as a metal, which acts as a first electrode, and then with a dielectric layer, such as an inert polymer layer. A metal-tipped stylus acts as a second electrode of a capacitor and the information signals are monitored by the stylus which notes changes in capacitance between the stylus and the disk surface as the information, in the form of depressions, passes beneath the stylus when relative motion is established between the disk and the stylus.

Optical recording methods in which light from a laser is focused upon the surface of a recording medium with sufficient intensity to cause ablation of surface material have also been proposed. In such methods, an information representative pattern of pits may be formed in the surface of the recording medium by suitably controlling the intensity of the focused light in accordance with the information to be recorded while relative motion is established between the recording medium and the focused light spot.

For instance, in recent years, attention has been increasingly paid to the information recording method in which information is written in a thin film of metal or the like formed on a substrate by using a laser ray or beam. According to such a method, the information recording has been accomplished by forming holes or recesses in the metallic thin film under the action of a thermal energy beam such as a laser ray. See, e.g., U.S. Pat. No. 4,238,803.

Spong, U.S. Pat. No. 4,097,895, describes a recording medium which comprises a light reflecting material, such as aluminum or gold, coated with a light absorbing layer, such as fluorescein, which is operative with an argon laser light source. The thickness of the light absorbing layer is chosen so that the structure has minimum reflectively. An incident light beam then ablates, vaporizes or melts the light absorbing layer, leaving a hole and exposing the light reflecting layer. After recording at the wavelength of the recording light, maximum contrast between the minimum reflectance of the light absorbing layer and the reflectance of the light reflecting layer exists. In this regard, note also U.S. Pat. No. 4,219,826.

Carlson, in U.S. Pat. No. 3,475,760, discloses a system for directly recording information in a thermoplastic film as a deformation by using a high energy laser scanning beam of small diameter. Erasure of the film deformation is accomplished by recording over the information to be erased using a similar laser beam but with a much smaller scan line spacing, preferably so as to provide overlap of the scan lines. Suitable thermoplastic films are disclosed as including vinyltoluenebutadiene, polystyrene ortho-terphenyl, polyethylene, and nitrocellulose.

The recording medium, of course, is one of the key elements in any optical and/or audio recording system, and this is particularly true in the home entertainment market where erasable recording disks would be a very desirable product, provided the recording disks could match the commercial magnetic tapes with regard to the technical parameters and the economics of a recording medium. Although many different media have been investigated for possible use in the various aforediscussed recording systems, and in particular the laser systems, a suitable recording medium or disk which is stable and economical, yet readily erasable when desired, has heretofore not been provided. Such a recording medium, and in particular if in the form of a disk, would be readily accepted and would fill the void in the video recording marketplace. The search for improved, erasable optical recording media is continuously ongoing.

Accordingly, it is a major object of the present invention to provide a novel optical recording medium which is stable, yet readily and accurately erasable when desired.

It is yet another object of the present invention to provide a novel erasable recording medium upon which information is recorded as a deformation and wherein said information can easily be erased to thereby provide a blank recording medium upon which information can be recorded.

It is still another object of the present invention to provide an erasable recording medium, particularly useful for video recordings, which comprises a polymeric layer exhibiting specifically selected properties to render the recording and erasing of information from the recording medium most effective and economic.

It is still another object of the present invention to provide an erasable recording disk comprising a uniquely suited polymer layer which renders the recording and erasing of information technically accurate and economically expedient.

These and other objects, as well as the scope, nature and utilization of the invention, will be apparent to those skilled in the art from the foregoing description and the appended claims.

SUMMARY OF THE INVENTION

In accordance with the foregoing objectives, provided hereby is such a novel information recording medium. The features of the present invention are in part derived from the discovery that dimer acid polyamides exhibit certain specified properties which make them most advantageously employable in erasable information recording media, particularly in disk form, wherein the information is recorded as deformations in a film layer comprising a dimer acid polyamide. Accordingly, the erasable information recording medium of the present invention comprises a multi-layer structure comprised of a relatively thick, thermally stable substrate, and a polymeric layer deposited on said substrate comprised of a dimer acid polyamide, e.g., having a weight average molecular weight in the range of from about 2,000 to 100,000, and most preferably in the range of from about 2,000 to about 20,000. Such a multi-layer structure comprising the said polymer layer has surprising applicability as an erasable information recording medium as it has excellent dimensional and mechanical stability on storage, readily and easily records information; and yet, has an ability to be readily and quickly erased when erasure is desired.

It is also preferable that the dimer acid polyamide polymer employed in the erasable recording medium of the present invention be soluble in conventional organic solvents, yet be insoluble in water. The dimer acid polyamide polymer should also preferably be capable of forming a thin film and be optically homogeneous and non-scattering upon forming said film, and should adhere well to the substrate.

In a preferred embodiment of the present invention, the information layer comprising the dimer acid polyamide further contains a dye which is absorptive at the light frequency of a predetermined recording light source.

DETAILED DESCRIPTION OF THE PREFERRED EMBODIMENTS

The polymers employed in the erasable recording medium of the present invention are dimer acid polyamides. Such polyamide resins are manufactured conventionally by reacting dimer acids, or their esters, with diamines, and can be obtained commercially. Such polymers, however, have not heretofore been recognized as being suitable for use in erasable information recording media.

The uniquely suitable dimer acid polyamides employed in the present invention are of a molecular weight so that the polyamide resin exhibits a melt viscosity (measured in poise) in the temperature range of from about 110° C. to about 200° C. such that the ratio of surface tension of the resin (measured in dynes/cm) to melt viscosity (measured in poise) at some point in said temperature range is at least 1:100. In general, the suitable dimer acid polyamide resins exhibit a weight average molecular weight in the range of from about 2,000 to about 100,000, typically up to about 60,000 weight average molecular weight. However, it is preferable that the dimer acid polyamide resin employed be a low molecular weight dimer acid polyamide having a weight average molecular weight in the range of from about 2,000 to about 20,000, more preferably in the range of from about 2,500 to about 18,000 and most preferably of from about 3,000 to about 16,000.

Such dimer acid polyamides are surprisingly well-suited for use in an erasable recording medium due to the polymers exhibiting the low melt viscosity, and hence, the combined properties of surface tension and viscosity such that the resin has a ratio of surface tension to viscosity of at least 0.01, preferably of at least 2, more preferably of at least five, and most preferably of at least eight, at some point in the temperature range of from about 110° C. to about 200° C. This ratio (in cm/sec) of surface tension (as measured in dynes/cm) to melt viscosity (as measured in poise) is believed to signify the capability of a polymer film comprised of the polymer to be erased, i.e., smoothed by levelling, as the rate of erasure is believed to be generally proportional to the surface tension of the polymer and inversely proportional to the melt viscosity of the polymer at the temperature of erasure. By exhibiting the aforementioned surface tension to viscosity ratio, an extremely fast erasure rate can be attained, e.g., up to $10^5$ bits/sec or more. Such a high erasure rate is extremely important for commercial erasable recording media such as in disk form, used in situations where time is of the essence, e.g., in data processing, in order to insure that proper and complete erasure of the information is attained when desired in a very short time and in a facile manner. Without such a capability for a quick, easy and complete erasure, the technical aspects and hence commercial viability of the product for such application would be adversely effected. The use of dimer acid polyamides in accordance with the present invention, however, provides such a capability.

Moreover, the ability of the dimer acid polyamides to have such a surface tension to melt viscosity ratio in the low temperature range of from 110° to 200° C., more preferably from 140° to 200° C., and most preferably from 150° to about 180° C., essentially precludes the possibility of writing during erasure since the erasure levelling occurs at a temperature well below the thermal degradation (or writing) temperature. Advantageously, the expenditure of energy for erasure is also of a relatively limited nature due to the capability of erasure of recorded information at such a low temperature. Yet, the erasure temperature for the recording medium of the present invention is still thereby sufficiently above normal ambient temperatures that recorded information is not inadvertently erased by levelling upon storage or upon scanning with a low intensity read laser beam.

Generally, it is preferred that the dimer acid polyamide employed exhibit a melt viscosity of about 5 poise or less at some point within the temperature range of about 110° C. to 200° C., although any melt viscosity which coupled with the surface tension gives a ratio of 0.01 would be suitable as discussed previously. Accordingly, the polymer film should preferably exhibit a surface tension of at least 10 dynes/cm, and more preferably at least 25 dynes/cm, in order to achieve the desired erasure and erasure rates, which would be achieved at the temperature(s) that the dimer acid polyamide film exhibits a viscosity of about 5 poise. It should be understood that the polymer film need not exhibit the aforementioned surface tension to viscosity ratio throughout the entire defined temperature range in order to realize the benefits thereof, but only at some point therein.

The lower molecular weight dimer acid polyamides, i.e., having a weight average molecular weight of from 2,000 to 20,000, are most preferred since they generally exhibit combined properties of surface tension and viscosity such that the resin has a ratio of surface tension to viscosity in the preferred range of at least two within the specified temperature range of from about 110° C. to 200° C. Thus, fast and effective erasure rates are insured. However, when a high intensity light source, e.g., laser, is employed, the lower molecular weight dimer acid polyamides would have a greater tendency to splatter during the recording of information vis-a-vis the higher molecular weight dimer acid polyamides, e.g., up to 100,000 weight average molecular weight. Thus, depending upon the intensity of the light/writing source to be used, a higher molecular weight dimer acid polyamide may be more suitable to avoid any problems with splattering.

While the dimer acid polyamides having a weight average molecular weight of greater than 20,000 and up to 100,000 exhibit generally lower ratios of surface tension to viscosity in the temperature range of from 110° C. to about 200° C., the ratio is at least 0.01, and thus does signify excellent erasure and levelling properties. The erasure rate may not accordingly be as high as for the lower molecular weight dimer acid polyamides, but their erasure capabilities are more than sufficient for applications where speed of erasure is not critical, e.g., for documents to be stored for any length of time, or for home use, where speed of erasure is not as important. Indeed, the erasure rate may still approach $10^3$ bits/sec. Accordingly, due to the properties exhibited by the higher molecular weight dimer acid polyamides, they as well show surprising applicability in an erasable information recording medium, i.e., excellent dimensional and mechanical stability on storage, the ready and easy recordation of information, yet an ability to be readily and accurately erased when erasure is desired.

The dimer acid polyamide resins employed in accordance with the present invention are also uniquely suited for use in the encoding layer for they generally exhibit a Vicat softening point in the range of from about 30° C. to about 120° C., even more preferably in the range of from about 45° C. to about 100° C., and most preferably in the range of from about 50° C. to about 80° C., with the softening point being an important property in regard to the dimensional stability of the recording medium upon storage. The possession of such a Vicat softening point insures that the polymer layer will remain dimensionally stable for normal variations in ambient temperature, and hence provide a permanent record upon storage. The Vicat softening point of a polymer can be measured in accordance with standard defined test procedures, e.g., ASTM D1525-76.

Further with regard to dimensional stability, the dimer acid polyamides of the present invention are also essentially insoluble in water so that the polymer layer does not swell in a humid environment. A recording disk of the present invention comprising a dimer acid polyamide should thus be unaffected by normal variations in humidity.

The dimer acid polyamides employed in the present invention also generally exhibit a third physicochemical property which, in combination with the Vicat softening point and surface tension to melt viscosity ratio, make them so suitable for use in an erasable recording medium. The temperature of the onset of thermal degradation, for example, as measured by thermogravimetric analysis and defined for the purposes of the present invention as that temperature at which a sample loses 10 percent of its original weight, is generally at least 250° C. for the dimer acid polyamides employed in the erasable recording medium of the present invention. More preferably, the temperature of thermal degradation is at least 300° C., but generally no greater than about 500° C. Accordingly, the thermal degradation temperature of the dimer acid polyamides sufficiently exceeds the erasure temperature range, e.g., up to about 200° C., so that no writing occurs during the erasure of information. This also provides for an important advantage, for if the temperature at which erasure can occur is too close to the thermal degradation temperature, problems with respect to the ease, completeness and quality of the erasure would be encountered.

The polymer film comprised of the dimer acid polyamides of the present invention also undergo thermal degradation with a minimal amount of charring and with a minimal amount of residue being left, e.g., about 2% or less. This allows the erasable recording medium surface to remain free of extraneous debris, etc. throughout the various erasure-recording sequences to which the recording medium may be subjected. Being free of debris thereby results in less scattering of light and less noise, i.e., a higher signal-to-noise ratio is achieved. The technical aspects of the recording medium are thereby more acceptable and commercially viable.

The dimer acid polyamides are also optically homogeneous and do not scatter light. The more optically homogeneous the polymer of a recording layer, of course, the better the technical parameters, e.g., higher resolution and/or information density, of the recording medium. This advantageous optical homogeneity of the dimer acid polyamides is believed to be due to their lack of crystallinity. Linear chain polyamides, such as the nylons, are high crystalline and hence of an opaque nature. The dimer acid polyamides of the present invention, however, are not of a crystalline or ordered structure due to the particular predominant structure of the dimer acid polyamides, which comprises a cyclic ring with aliphatic side chains attached thereto.

Preparation of the dimer acid polyamides employed in the invention can be carried out in the conventional manner by reacting substantially equivalent amounts of the diamines with the dimer acids or the amide-forming derivatives thereof, especially their esters, at condensation temperatures between about 160° C. and 250° C. The residual water of condensation can be advantageously removed by applying a vacuum, e.g., of 15-20 mm Hg for 1 to 2 hours. The polymerization is conducted until a dimer acid polyamide product of the desired (or suitable) molecular weight is attained.

As mentioned, instead of the free acids it is also possible to use, in the conventional manner, their amide-forming derivatives, especially their acid esters, the natural choice being those that can readily be subjected to aminolysis, for example, methyl esters and ethyl esters.

The dimeric carboxylic acids used in the manufacture of the polyamides of the present invention can be prepared in known manners. See, for example, *Encyclopedia of Chemical Technology*, Kirk-Othmer, 3rd ed., Vol. 7, pp. 768 et seq. and articles referenced therein. Generally, the dimer acids can be prepared, for example, by radical or ionic polymerization or by thermal polymerization. The starting materials used in such polymerization processes are natural monoethylenic or polyethylenic carboxylic acids and possibly also saturated or monoacetylenic or polyacetylenic carboxylic acids. Polymerization is preferably carried out with the aid of a catalyst, e.g., alumina. In addition to dimeric carboxylic acid, the polymer obtained can also contain varying minor amounts of monomeric and trimeric carboxylic acids. Pure dimeric carboxylic acid is obtainable, however, by distillation. The dimeric carboxylic acid used for the preparation of the polyamides of the invention preferably has a dimeric carboxylic acid content of at least about 60%, and more preferably a dimeric carboxylic acid content of at least from 70 to 90% by weight. The remainder comprises trimeric and higher polymeric components and monomeric carboxylic acid.

The diamines used in the manufacture of the polyamides employed in the present invention can be any suitable diamine which can provide a polyamide product of the desired molecular weight and/or physical and chemical properties. Preferred are the aliphatic diamines having from 2 to about 6 carbon atoms (i.e., ethylene diamine to hexamethylene diamine), with ethylene diamine in mixture with higher diamines being most preferred. When ethylene diamine is employed in a predominant amount, the predominant structure of the dimer acid polyamide resin would comprise recurring units of the structural formula

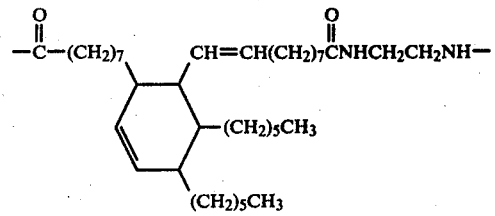

The cyclic ring and aliphatic side chains of the polyamide resin lead to the amorphous characteristic of the polymer which is believed to account for the polymer's excellent optical properties, i.e., optical homogeneity.

Suitable dimer acid polyamide materials for use in the erasable recording medium of the present invention are commercially available, e.g., from Union Camp Corporation under the registered trademark Uni-Rez®, and from Emery Industries, Inc. under the registered trademark Emerez®. Such low molecular weight dimer acid polyamides have heretofore been used as hot melt adhesives and in printing inks.

The following table lists the physical properties of several such commercially available and suitable resins. The viscosity measurements were made by a rotational viscometry technique using a Brookfield Synchro-Lectric Viscometer manufactured by Brookfield Engineering Laboratories, Inc., Stoughton, Mass. The thermogravimetric analyses in the table were obtained with a DuPont Model 951 thermogravimetric analyzer, with the samples maintained under a nitrogen atmosphere at a heating rate of 15° C./minute.

TABLE

| | | | | | | | | |
|---|---|---|---|---|---|---|---|---|
| | | | DIMER ACID POLYAMIDES | | | VISCOSITY, (POISE) | | |
| | M.P. | VICAT** | DSC | | | | | |
| | (LIT.) | S.P. | M.P. | H MELT | TGA | | BROOKFIELD | * |
| RESIN | (°C.) | (°C.) | (°C.) | (CAL/G) | T(10%)°C. | LIT (TEMP) | (150°) | $\overline{M}_w$ |
| UNIREZ ® | | | | | | | | |
| 2220 | 110 | 40 | 107 | 0.6 | 386 | 1.7 (160) | — | — |
| 2931 | 110 | 72 | 105 | 5.6 | 391 | 30 (160) | 88 | 13,600 |
| 2940 | 110 | 70 | 107 | 4.8 | 385 | 15 (160) | 34 | 9,600 |
| 2942 | 102 | 54 | 92 | 2.6 | 407 | 16 (160) | 24 | — |
| 2961 | 142 | — | 104 | 3.8 | 382 | 1 (160) | ... | 3,200 |
| EMEREZ ® | | | | | | | | |
| 1530 | 110 | 57 | 108 | 5.8 | 398 | 24 (160) | 115 | 16,300 |
| 1533 | 104 | 54 | 87 | 2.0 | 385 | 33 (160) | 220 | 7,600 |
| 1540 | 110 | 78 | 110 | 6.2 | 394 | 16 (160) | 75 | 15,500 |
| 1548 | 120 | 45 | 117 | 2.0 | 428 | 8 (160) | 25 | 3,100 |
| 1549 | 120 | — | 111 | 1.2 | 381 | 14 (160) | 38 | — |
| 1552 | 137 | 37 | 89,121 | 4.0,1.0 | 408 | 60 (190) | — | 26,000 |
| 1553 | 110 | 36 | 93 | 2.1 | 415 | 100 (190) | — | 58,000 |
| 1565 | 95 | — | 54 | 1.3 | 403 | 5 (190) | 40 | — |
| 1556 | 100 | — | 99 | 5.9 | 394 | 8 (190) | 110 | — |
| 1566 | 165 | 43 | 109,135 | 2.3,1.3 | 413 | 80 (190) | — | 33,000 |

*Weight average molecular weight ($\overline{M}_w$) determined in reference to calibrated polystyrene samples.
**Blanks indicate molded disks either too brittle or too soft for the Vicat measurement.

As can be seen from the Table, the Vicat softening point for the materials examined fall within the range of from about 36° to 78° C.

From the melt viscosity data obtained by measurement with a Brookfield viscometer at 150° C. and the manufacturer's viscosity data, a temperature at which the viscosity of the polymer reaches 5 poise can be extrapolated using the relationship of the log of the viscosity vs 1/T. For the majority of Emerez materials and the Unirez 2931, 2940 and 2942 materials, a viscosity of 5 poise is achieved in the range of 167° to 197° C. Such a melt viscosity in conjunction with the surface tension of the dimer acid polyamides employed in accordance with the present invention, which is generally at least 10 dynes/cm in the temperature range of from about 110° to 200° C., allows for complete and accurate erasure to be quickly attained. (The surface tension of a polymer material can be measured by conventional methods. Examples of such methods include the capillary rise method, the drop weight method, the Wilhelmy plate method and the du Nouy method. The surface tension is found to be largely independent of molecular weight for a class of polymers.) Even for the higher molecular weight materials, e.g., Emerez 1552, 1553 and 1566, the melt viscosity in the temperature range of from 110° C. to 200° C. is such as to allow for a ratio of surface tension/melt viscosity of 0.01, and at least 0.1. This as well signifies the suitability of the higher molecular weight dimer acid polyamides for use in an erasable recording medium.

From the thermogravimetric analyses (TGA), it is seen that the thermal decomposition temperature of all the materials listed fall within the range of from about 380° to 430° C. The TGA scans also indicated that the residue after complete thermal degradation is around 2% or less.

The substrate of the erasable recording medium of the present invention to which the dimer acid polyamide is applied is illustratively, and preferably, formed in the shape of a disk, a major surface of which is processed to be polished and flat. The substrate is made of a thermally stable material, which is also mechanically rigid and dimensionally stable and which ideally has an isotropically low coefficient of thermal expansion. Therefore, the recording medium does not warp during storage, writing, erasure or reading.

Depending upon the particular, conventional read mechanism employed, the substrate may be opaque, transparent or highly reflective regarding the read laser beam. It is also preferred that the substrate material be compatible with the polymer employed and that the polymer adhere well to the substrate. Good adhesion, for example, may be defined operationally as the inability to remove the coating from the substrate by means of adhesive tape, e.g., Scotch ® brand type. Examples of suitable materials for the substrate include glass, polycarbonate, and polymethylmethacrylate, as well as metals such as aluminum.

If the polymer employed in the recording film is transparent at the predetermined wavelength of the laser output for writing, it is generally necessary to add a dye of appropriate absorption wavelength to the polymer in order to effect absorption of the incident radiation. If, for example, the writing is to be achieved with a helium-neon laser of 633 nm, then Oil Blue N dye, *Colour Index* 61555, $\lambda_{max}$ 637 nm, would be a suitable dye for incorporation into the polymer film. If, however, an argon laser is used which provides an output of a wavelength of about 458 nm, an organic dye such as fluorescein, which is highly absorptive at the light frequency of the argon laser, can advantageously be used. Other dyes which may be used include certain nigrosine dyes. Of course, it is preferred to employ dyes of suitable properties so as to not detrimentally affect the recordability and erasability of the recording medium. The addition of a dye may change the physical properties, e.g., melt viscosity of the polymer layer, and this should be taken into account when choosing an appropriate polymer/dye system. Other additives, e.g., stabilizers, might also be desirably added to the polymer, and their affect, if any, on the properties should also be considered.

The erasable recording medium of the present invention is prepared by coating the substrate with a polymer or polymer/dye film. Since the read, write and erase steps all require operating within a very narrow depth of focus, the film, when applied, must provide a very flat surface in order to avoid errors and noise. In order to facilitate the coating procedure, it is also generally advantageous that the polymer (and dye) be soluble in an organic solvent, such as an alcohol or ketone. In this regard, when a dye is used, the polymer and dye should be compatible and mutually co-soluble. Also, upon evaporation of the solvent, the dye (or other additives if present) should not precipitate in a particulate form, which particulates would cause a scattering of light.

Any suitable coating technique may be used to achieve such a flat surface, with a conventional technique such as spin coating, which allows for a high degree of control of film thickness and flatness, being preferred. It is, of course, important that the polymer form a thin membrane coating.

For example, the dimer acid polyamide resins employed in accordance with the present invention may be readily cast from a toluene-propanol solution onto glass or polymethylmethacrylate to afford thin optically homogeneous (not cloudy) films. The films generally adhere well to glass and polymethylmethacrylate and cannot be removed via adhesive tape.

In an illustrative recording system embodying the principles of the present invention, a record blank of the abovedescribed (disk) form is subject to rotation at a constant linear or constant angular velocity while a beam of light from a light source, e.g., a laser, is focused on the polymer surface of the disk. The intensity of the light beam is controlled in accordance with information to be recorded. Illustratively, the control is effected in accordance with carrier waves modulated in frequency by picture-representative video signals, with the light beam intensity varying as a result between a high level sufficient to effect ablation of the absorptive material and a low level insufficient to effect such ablation, the frequency of the level alternations varying as the video signal amplitude changes. Preferred writing speeds are in the range of from $10^6$ to $10^7$ bits per second.

The relative diameter and depth of the holes or pits formed by ablation will, of course, depend not only on the optical and thermal properties of the polymer or polymer/dye layer, but also on the characteristics of the writing beam, i.e., focused spot diameter, depth of focus, intensity profile and intensity and duration of the writing pulse. Optimization of these parameters is familiar to those skilled in the art. It is preferred, however, that the ablation of the polymer layer does not proceed to the substrate layer. If ablation is to proceed to the substrate, the substrate material employed is preferably glass or a metallized substrate or some other high surface energy substrate material.

As a result of the ablation of the polymeric material, an information track comprising a succession of spaced pits is formed in the polymer surface of the disk, the pits appearing in those surface regions exposed to the high intensity beam due to vaporization of the polymer layer material in response to the high intensity beam exposure. Variations in the length and separation of the pits are representative of the recorded information. Where a continuous sequence of pictures is to be recorded, a spiral information track may be formed by providing relative motion, in a radial direction and at a constant rate during the recording, between the recording beam and the rotating disk. Alternatively, in the absence of such relative motion during the recording, a circular information track may be formed appropriate for "slide" or freeze-frame recording purposes.

The result of the above-described recording process is the formation of an information record of a form which facilitates recovery of the recorded information by optical playback processes. The information track of such an information record comprises (1) undisturbed surface regions alternating with (2) pit regions formed by the ablation process, due to complete, or at least partial, removal of the polymer layer coating of the substrate. This information track can be, for example, in either analog or digital form.

In playback or read operations pursuant to the principles of the present invention, a light beam is focused upon the information track of a rotating information record of the above-described type. The playback beam has a constant intensity at a level insufficient to effect ablation of the polymer layer or erasure of the recorded information by levelling. A photodetector, positioned to receive light reflected from the successive regions of the information track as they pass through the path of the focused light, develops a signal representative of the recorded information.

Several variations in the playback or reading system are possible with the erasable recording medium of the present invention. For example, the information can be read based upon the relative reflection from the surface of the polymer or polymer/dye layer of the disk. In this mode, when a beam from the read laser is focused on the surface of the disk a part of the light is absorbed, but a fraction of the light is reflected. The reflected rays retrace their path back through a lens and are directed by a beamsplitter to a photodetector. When the read beam encounters a hole or pit created during the writing step, however, the rays ae scattered and a lower intensity is reflected back toward the detector. Thus, a written bit is registered as a decrease in reflected intensity. Alternatively, the read beam can be focused at a level corresponding to the depth of the ablated hole (as predetermined), so that a bit is registered as an increase in reflected intensity. The chief function of the substrate in either of the aforediscussed modes is to provide mechanical support for the active layer since the substrate's reflectivity or transparency does not come into play. The substrate is preferably of a transparent nature when used in conjunction with such a playback system.

Information can also be read via a system atuned to the relative reflectance from the surface of the substrate. In this mode, the substrate must be of a reflective nature in an appropriate wavelength range. For example, the substrate can have a metallized surface, e.g., of aluminum, upon which the polymer is deposited. In operation, the read laser is focused on the highly reflective surface. In the unwritten portions of the disk, i.e., having no pits, a part of the incident beam is absorbed upon going through the polymer/dye layer and that part which is reflected from the surface does not retrace its path to thereby be detected by a photodetector. In the recorded portions of the disk, however, i.e., having the pits formed via ablation, the beam goes through a shorter distance of absorbing layer, and is reflected from the substrate reflective surface, so that a bit is registered as an increase in reflected intensity.

The read mode can also be adjusted to read in accordance with relative reflectance from the surface of the polymer layer and from the surface of the substrate. Again, the substrate, when employing this mode, should be reflective. This concept or mode is described by D. G. Howe and J. J. Wrobel, in *J. Vac. Sci. Technol.*, 18, 92 (1981). See also U.S. Pat. No. 4,097,895.

When employing this mode, the recording medium should comprise a dyed polymer layer of a precise thickness which is coated onto a reflective, e.g., metallized, substrate. Writing is done at a wavelength where the dye absorbs and reading at a wavelength where the dye is transparent. In the read step, reflection occurs both from the surface of the dyed polymer and from the surface of the metallized substrate, and these reflections can combine either constructively or destructively at the surface of the polymer coating. If the thicknesses of the initial coating and of the coating remaining in the ablated hole are chosen correctly, then the combination is destructive in the unwritten areas and constructive in the ablated areas, so that a bit is registered as an increase in the intensity of reflected light.

Information can also be read, for example, based upon light transmission through the disk. In such a playback system, it is necessary for the substrate to be transparent. A recorded bit is registered as an increase in intensity of the light transmitted through the disk since there is less absorbing dye in the path of the beam where the dye/polymer layer material has been ablated.

Due to the particular selected properties exhibited by the polymers comprising the polymer layer of the recording medium of the present invention, complete and accurate erasure of recorded information can be most facilitously accomplished. Erasure of the recorded information is readily carried out by heating the disk to a sufficiently high temperature such that the dye/polymer layer becomes fluid and the surface is levelled by surface tension forces, i.e., in the temperature range of from about 140° to 200° C. This may be done globally by heating the entire disk in an oven or some other suitable heating means, or by means of a laser beam whose intensity is intermediate between that of the write beam and read beam. It is generally necessary to heat an area considerably greater than that of a single bit (typically 1 μm in diameter), so that addressable (bit-by-bit) erasure can be difficult.

Although the invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. In an ablative recording medium, for use with a recording laser providing light of a predetermined frequency, comprising a thermally stable substrate and a polymer layer coated thereon, the improvement which comprises said polymer layer being comprised of a dimer acid polyamide.

2. The recording medium of claim 1, wherein the dimer acid polyamide has a weight average molecular weight in the range of from about 2,000 to about 100,000.

3. The recording medium of claim 2, wherein the recording medium is in the form of a disk.

4. The recording medium of claim 2, wherein said dimer acid polyamide polymer layer coated on the substrate further comprises a dye material which is absorptive at the frequency of the recording laser.

5. The recording medium of claim 2, wherein the dimer acid polyamide has a weight average molecular weight of less than 60,000.

6. The recording medium of claim 2, wherein the dimer acid polyamide has a weight average molecular weight in the range of from about 2,000 to about 20,000.

7. The recording medium of claim 6, wherein said dimer acid polyamide polymer layer coated on the substrate further comprises a dye material which is absorptive at the frequency of the recording laser.

8. The recording medium of claim 7, wherein the recording medium is in the form of a disk.

9. The recording medium of claim 7, wherein the dimer acid polyamide has a weight average molecular weight in the range of from about 2,500 to about 18,000.

10. The recording medium of claim 7, wherein the dimer acid polyamide has a weight average molecular weight in the range of from about 3,000 to about 16,000.

11. The recording medium of claim 7, wherein the substrate comprises glass, polycarbonate or polymethylmethacrylate.

12. The recording medium of claim 7, wherein the substrate has a top layer adjacent the polymer layer which is a metallized reflective layer to thereby render the substrate reflective.

13. The recording medium of claim 7, wherein the substrate is transparent.

14. In an ablative recording medium, for use with a recording laser providing a thermally stable substrate and a polymer layer coated thereon, the improvement which comprises said polymer layer being comprised of a dimer acid polyamide having a surface tension, measured in dynes/cm, and a melt viscosity, measured in poise, in the temperature range of from about 110° to 200° C. such that the ratio of said surface tension to melt viscosity at some point within said temperature range is at least 0.01.

15. The recording medium of claim 14, wherein the dimer acid polyamide has a weight average molecular weight in the range of from about 2,000 to about 100,000.

16. The recording medium of claim 15, wherein the polymer layer further comprises a dye material and the dimer acid polyamide/dye combination exhibits said ratio of surface tension to melt viscosity of at least 0.01.

17. The recording medium of claim 14, wherein the dimer acid polyamide has a Vicat softening point of from about 30° to 120° C. and a temperature for the onset of thermal degradation of at least 250° C.

18. The recording medium of claim 14, wherein the surface tension and viscosity exhibited by the polymer is such that the ratio of surface tension to viscosity at some point in the temperature range of from about 140° to about 200° C. is at least 2:1.

19. The recording medium of claim 18, wherein the dimer acid polyamide has a weight average molecular weight in the range of from about 2,000 to about 20,000.

20. An optically readable and erasable information disk comprising a thick and thermally stable substrate having coated thereon a polymer layer information track comprised of a succession of spaced pits, said polymer layer being comprised of a dimer acid polyamide.

21. The information disk of claim 20, wherein the dimer acid polyamide has a weight average molecular weight in the range of from about 2,000 to about 100,000.

22. The information disk of claim 21, wherein said dimer acid polyamide polymer layer coated on the substrate further comprises a dye material which is absorptive at the frequency of a recording laser.

23. The information disk of claim 22, wherein the dimer acid polyamide/dye exhibit a surface tension, measured in dynes/cm, and a melt viscosity, measured in poise, in the temperature range of from about 110° to about 200° C. such that the ratio of surface tension to melt viscosity at some point within said temperature range is at least 0.01.

24. The information disk of claim 21, wherein the dimer acid polyamide has a weight average molecular weight in the range of from about 2,000 to about 20,000.

25. The information disk of claim 24, wherein the polymer layer further comprises a dye material which is absorptive at the frequency of a recording laser.

26. The information disk of claim 25, wherein the dimer acid polyamide has weight average molecular weight in the range of from about 2,500 to about 18,000.

27. The information disk of claim 25, wherein the dimer acid polyamide has a weight average molecular weight in the range of from about 3,000 to about 16,000.

28. The information disk of claim 25, wherein the dimer acid polyamide exhibits a surface tension, measured in dynes/cm, and a melt viscosity, measured in poise, in the temperature range of from about 140° to 200° C. such that the ratio of said surface tension to melt viscosity at some point within said temperature range is at least 2:1.

29. The information disk of claim 20, wherein the dimer acid polyamide exhibits a surface tension, measured in dynes/cm, and a melt viscosity, measured in poise, in the temperature range of from about 110° to 200° C. such that the ratio of surface tension to melt viscosity at some point within said temperature range is at least 0.01.

30. An optically readable and erasable information disk comprising a relatively thick and thermally stable substrate having coated thereon a polymer layer comprising an information track comprised of a succession of spaced pits, said polymer layer being comprised of a dimer acid polyamide having a weight average molecular weight in the range of from about 2,000 to about 100,000; a Vicat softening point of from about 30° to 120° C.; a surface tension, measured in dynes/cm, and a melt viscosity, measured in poise, in the temperature range of from about 110° to 200° C. such that the ratio of said surface tension to melt viscosity at some point within said temperature range is at least 0.01; and a temperature for the onset of thermal degradation of at least 250° C.

31. The information disk of claim 30, wherein the dimer acid polyamide layer further comprises a dye material.

32. The information disk of claim 30, wherein the weight average molecular weight of the dimer acid polyamide is in the range of from about 2,000 to about 20,000, and the ratio of surface tension to melt viscosity is at least 2:1.

33. The information disk of claim 32, wherein the surface tension and viscosity exhibited by the dimer acid polyamide is such that the ratio of surface tension to viscosity at some point in the temperature range of from about 140° to 200° C. is at least 5:1.

34. The information disk of claim 32, wherein the dimer acid polyamide layer further comprises a dye material.

35. The information disk of claim 32, wherein the substrate comprises glass, polycarbonate or polymethylmethacrylate.

36. The information disk of claim 35, wherein the substrate comprises a light reflective surface.

37. An erasable information medium, useful with playback apparatus employing a playback beam of light of a predetermined frequency, said medium comprising a substrate having a light reflective surface and a polymer layer comprised of a dimer acid polyamide having a weight average molecular weight in the range of from about 2,000 to about 100,000, with an information track comprising a succession of pits formed in said dimer acid polyamide layer, wherein the thickness of said dimer acid polyamide layer in all regions of the information medium other than those occupied by said pits is a given thickness chosen so as to establish a destructive reflection condition for light directed toward said information medium at the predetermined frequency.

38. The information medium of claim 37, wherein the information medium is in the form of a disk.

39. The information medium of claim 37, wherein said dimer acid polyamide layer coated on the substrate further comprises a dye material.

40. The information medium of claim 37, wherein said dimer acid polyamide has
(i) a Vicat softening point of from about 30° to 120° C.;
(ii) a surface tension, measured in dynes/cm, and a melt viscosity, measured in poise, in the temperature range of from about 110° to 200° C. such that the ratio of said surface tension to melt viscosity at some point within said temperature range is at least 0.01; and,
(iii) a temperature for the onset of thermal degradation of at least 250° C.

41. The information medium of claim 40, wherein the substrate has a top layer adjacent the dimer acid polyamide polymer layer which is a metallized reflective layer to thereby render the substrate reflective.

42. The information medium of claim 40, wherein the dimer acid polyamide has a weight average molecular weight in the range of from about 2,000 to about 20,000.

43. The information medium of claim 42, wherein said dimer acid polyamide layer coated on the substrate further comprises a dye material.

44. The information medium of claim 43, wherein the information medium is in the form of a disk.

45. The information medium of claim 43, wherein said dimer acid polyamide has a surface tension, measured in dynes/cm, and a melt viscosity, measured in poise, in the temperature range of from about 110° to 200° C. such that the ratio of said surface tension to melt viscosity at some point within said temperature range is at least 2:1.

46. The information medium of claim 43, wherein the substrate has a top layer adjacent the dimer acid polyamide polymer layer which is a metallized reflective layer to thereby render the substrate reflective.

47. A method of recording information in a thin film deposited on a relatively thick substrate by irradiating the film with a laser beam in accordance with said information to form pits in the film, the improvement which comprises said film being comprised of a dimer acid polyamide.

48. The method of recording of claim 47, wherein the dimer acid polyamide has a weight average molecular weight in the range of from about 2,000 to about 100,000.

49. The method of recording of claim 48, wherein the dimer acid polyamide layer coated on the substrate further comprises a dye material absorptive at the frequency of the recording laser.

50. The method of recording of claim 48, wherein said dimer acid polyamide has a weight average molecular weight in the range of from about 2,000 to about 20,000.

51. The method of recording of claim 50, wherein said dimer acid polyamide layer coated on the substrate further comprises a dye material which is absorptive at the frequency of the recording laser.

52. A method of erasing a deformation information pattern of an information medium, which deformation pattern is formed in a film deposited on a substrate and with said erasing being achieved by heating said film, the improvement which comprises said film being comprised of a dimer acid polyamide.

53. The method of erasing of claim 52, wherein the dimer acid polyamide has a weight average molecular weight in the range of from about 2,000 to about 100,000.

54. The method of erasing of claim 53, wherein said dimer acid polyamide has a weight average molecular weight in the range of from about 2,000 to about 20,000.

55. The method of erasing of claim 54, wherein the dimer acid polyamide exhibits a surface tension, measured in dynes/cm, and a melt viscosity, measured in poise, in the temperature range of from about 140° to 200° C. such that the ratio of said surface tension to melt viscosity at some point within said temperature range is at least 2:1.

56. The method of erasing of claim 55, wherein the dimer acid polyamide has a Vicat softening point of from 30° to 120° C., and a temperature for the onset of thermal degradation of at least 250° C.

57. The method of erasing of claim 55, wherein the surface tension and viscosity exhibited by a polymer is such that the ratio of surface tension to viscosity at some point in the temperature range of from about 140° to about 200° C. is at least 5:1.

58. The method of erasing of claim 55, wherein the polymer film is heated during erasure to a temperature at least 50° C. below the temperature used in recording the information.

59. The method of erasing of claim 55, wherein the dimer acid polyamide film is heated to a temperature in the range of from about 110° to 200° C. sufficient to effect levelling of the polymer film.

60. The method of erasing of claim 54, wherein the dimer acid polyamide film further comprises a dye material.

61. The method of erasing of claim 53, wherein said dimer acid polyamide exhibits a surface tension, measured in dynes/cm, and a melt viscosity, measured in poise, in the temperature range of from about 110° to 200° C. such that the ratio of said surface tension to melt viscosity at some point within said temperature range is at least 0.01.

62. The method of erasing of claim 61, wherein said dimer acid polyamide has a Vicat softening point of from about 30° to 120° C., and a temperature for the onset of thermal degradation of at least 250° C.

63. The method of erasing of claim 61, wherein the dimer acid polyamide film is heated to a temperature in the range of from about 110° to 200° C. sufficient to effect levelling of the polymer film.

64. The method of erasing of claim 61, wherein the polymer film is heated during erasure to a temperature at least 50° C. below the temperature used in recording the information.

65. The method of erasing of claim 53, wherein the recording medium is in the form of a disk.

66. The method of erasing of claim 53, wherein the dimer acid polyamide film further comprises a dye material.

* * * * *